(12) United States Patent
Nagashima et al.

(10) Patent No.: US 12,461,362 B2
(45) Date of Patent: Nov. 4, 2025

(54) OPTICAL MODULE AND OPTICAL DEVICE

(71) Applicant: FURUKAWA ELECTRIC CO., LTD., Tokyo (JP)

(72) Inventors: Kazuya Nagashima, Tokyo (JP); Yozo Ishikawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 578 days.

(21) Appl. No.: 17/814,390

(22) Filed: Jul. 22, 2022

(65) Prior Publication Data

US 2022/0365340 A1 Nov. 17, 2022

Related U.S. Application Data

(63) Continuation of application No. PCT/JP2021/002889, filed on Jan. 27, 2021.

(30) Foreign Application Priority Data

Jan. 30, 2020 (JP) ................................. 2020-013857

(51) Int. Cl.
*G02B 27/00* (2006.01)
*G02B 3/00* (2006.01)

(52) U.S. Cl.
CPC ....... *G02B 27/0025* (2013.01); *G02B 3/0043* (2013.01)

(58) Field of Classification Search
CPC .......................... G02B 27/0025; G02B 3/0043
USPC ........................................................ 359/737
See application file for complete search history.

(56) References Cited

U.S. PATENT DOCUMENTS

| | | | |
|---|---|---|---|
| 6,558,005 B1 * | 5/2003 | Bierhuizen | ........ G03B 21/2066 348/E9.027 |
| 6,867,921 B2 | 3/2005 | Harwit et al. | |
| 6,934,460 B2 | 8/2005 | Morris et al. | |
| 7,388,714 B2 | 6/2008 | Liang et al. | |
| 8,822,258 B2 | 9/2014 | Fan | |
| 9,787,402 B2 | 10/2017 | Flintham et al. | |
| 10,151,859 B2 | 12/2018 | Park | |
| 2004/0047557 A1 | 3/2004 | Muto et al. | |
| 2004/0051940 A1 | 3/2004 | Liang et al. | |
| 2004/0233539 A1 | 11/2004 | Harwit et al. | |
| 2005/0047748 A1 | 3/2005 | Morris et al. | |
| 2008/0317403 A1 | 12/2008 | Kubo et al. | |

(Continued)

FOREIGN PATENT DOCUMENTS

| | | |
|---|---|---|
| CN | 103890949 A | 6/2014 |
| CN | 106464383 A | 2/2017 |

(Continued)

OTHER PUBLICATIONS

International Search Report issued Apr. 6, 2021 in PCT/JP2021/002889, filed on Jan. 27, 2021, 3 pages.

(Continued)

*Primary Examiner* — William Choi
(74) *Attorney, Agent, or Firm* — Oblon, McClelland, Maier & Neustadt, L.L.P.

(57) ABSTRACT

An optical module includes: an optical device; an array lens member that integrally includes a plurality of parallel lens units optically connected to the optical device; and a correction optical element configured to correct light that passes through the lens units.

18 Claims, 10 Drawing Sheets

(56) References Cited

U.S. PATENT DOCUMENTS

| | | |
|---|---|---|
| 2014/0087491 A1 | 3/2014 | Fan |
| 2014/0307081 A1 | 10/2014 | Rudmann et al. |
| 2016/0241751 A1 | 8/2016 | Park |
| 2017/0019181 A1 | 1/2017 | Flintham et al. |

FOREIGN PATENT DOCUMENTS

| | | |
|---|---|---|
| JP | 2004-101848 A | 4/2004 |
| JP | 2007-173746 A | 7/2007 |
| JP | 2009-3171 A | 1/2009 |
| JP | 2014-163897 A | 8/2014 |
| JP | 2014-526067 A | 10/2014 |
| JP | 2017-513071 A | 5/2017 |

OTHER PUBLICATIONS

Combined Chinese Office Action issued Jun. 28, 2024 in Chinese Application No. 202180010378.8 with English translation of the cover page and English machine translation of the body thereof, 19 pgs.

Combined Chinese Office Action and Search Report issued Jan. 27, 2024 in Chinese Patent Application No. 202180010378.8 (with partial translation and unedited computer-generated English translation), 20 pages.

\* cited by examiner

OPTICAL MODULE AND OPTICAL DEVICE

This application is a continuation of International Application No. PCT/JP2021/002889, filed on Jan. 27, 2021 which claims the benefit of priority of the prior Japanese Patent Application No. 2020-013857, filed on Jan. 30, 2020, the entire contents of which are incorporated herein by reference.

BACKGROUND

The present disclosure relates to an optical module and an optical device.

In the related art, an optical module that includes an array lens including a plurality of parallel lens units is known (Japanese Laid-open Patent Publication No. 2004-101848).

SUMMARY

In the array lens, the plurality of parallel lens units are arranged in an integrated manner, and therefore, for example, an optical path or a beam diameter of at least one of light rays that pass through the lens units may deviate from a desired value due to a manufacturing variation of the array lens.

There is a need for an optical module and an optical device each including an array lens member that includes a plurality of parallel lens units, correct light that passes through the lens units.

According to one aspect of the present disclosure, there is provided an optical module including: an optical device; an array lens member that integrally includes a plurality of parallel lens units optically connected to the optical device; and a correction optical element configured to correct light that passes through the lens units.

DETAILED DESCRIPTION

Exemplary embodiments and modifications of the present disclosure will be disclosed below. Configurations of the embodiments and the modifications described below, and operational advantages (effects) achieved by the configurations are mere examples. The present disclosure may be implemented by configurations other than the configurations disclosed in the embodiments and the modifications below. Furthermore, according to the present disclosure, it is possible to obtain at least one of various effects (including derivative effects) that are achieved by the configurations.

The embodiments and the modifications described below have the same configurations. Therefore, according to the configurations of each of the embodiments and the modifications, it is possible to achieve the same operational advantages based on the same configurations. Furthermore, in the following, the same configurations are denoted by the same reference symbols, and repeated explanation may be omitted in some cases.

In the present specification, ordinal numbers are assigned, for the sake of convenience, to distinguish between components, parts, and the like, and do not indicate priorities or order.

In addition, in each of the drawings, an X direction is indicated by an arrow X, a Y direction is indicated by an arrow Y, and a Z direction is indicated by an arrow Z. The X direction, the Y direction, and the Z direction cross one another and are perpendicular to one another.

First Embodiment

Figure 1:
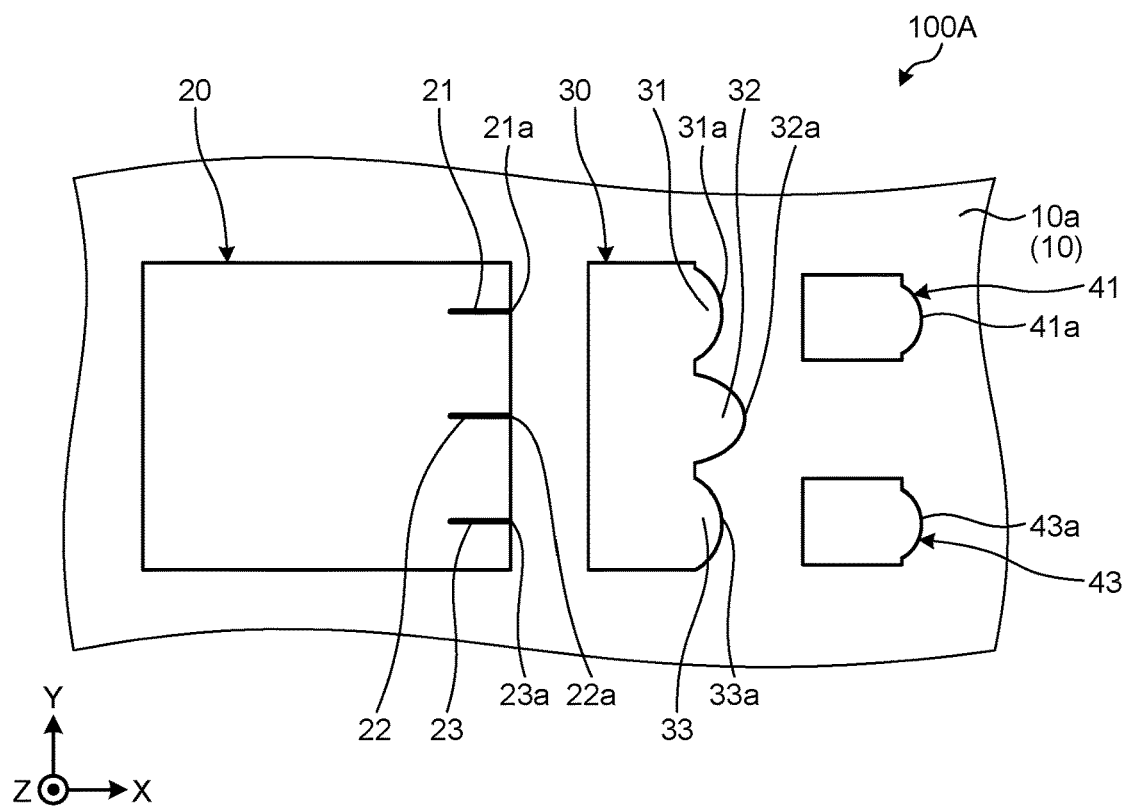
FIG. 1 is an illustrative and schematic plan view of an optical module according to a first embodiment.

FIG. 1 is a plan view of an optical module 100A according to a present embodiment. As illustrated in FIG. 1, the optical module 100A includes a substrate 10, an optical device 20, an array lens member 30, and correction optical elements 41 and 43.

The substrate 10 extends while crossing the Z direction. In the present embodiment, the substrate 10 extends in the X direction and the Y direction and perpendicularly intersects the Z direction. Further, the substrate 10 includes a base surface 10a. The base surface 10a has a planer shape and extends while crossing the Z direction. In the present embodiment, the base surface 10a extends in the X direction and the Y direction and perpendicularly intersects the Z direction. The substrate 10 is, for example, a semiconductor substrate. The substrate 10 may be referred to as a base and the base surface 10a may be referred to as a surface.

Each of the optical device 20, the array lens member 30, and the correction optical elements 41 and 43 is mounted on the base surface 10a by bonding, soldering, or the like.

The optical device 20 includes a plurality of parallel input/output units 21 to 23. The input/output units 21 to 23 are, for example, output units of light-emitting elements, such as laser light-emitting elements, or input units of light-receiving elements, such as photodiodes.

Further, the optical device 20 may be, for example, a device, such as a modulator or a coherent mixer, which includes the plurality of optical input/output units 21 to 23. A spot size of a laser light-emitting element, a modulator, a coherent mixer, or the like serving as the optical device 20 is about 3.5 micrometers (μm) or less, which is smaller than a spot size of a single mode optical fiber. Furthermore, the optical device 20 may be an optical fiber array.

The plurality of input/output units 21 to 23 are arranged in the Y direction. End portions 21a to 23a of the plurality of input/output units 21 to 23 in the X direction are arranged (aligned) in the Y direction. However, embodiments are not limited to this example, and the plurality of input/output units 21 to 23 may be arranged in a slightly deviated manner in the X direction.

The plurality of input/output units 21 to 23 are arranged at equal intervals in the Y direction. However, embodiments are not limited to this example, and the interval between the plurality of input/output units 21 to 23 need not be an equal distance.

Further, the plurality of input/output units 21 to 23 are arranged so as to be separated from the base surface 10a by equal distances in the Z direction. However, embodiments are not limited to this example, and the distances of the plurality of input/output units 21 to 23 from the base surface 10a may be different from one another.

Light rays input to the plurality of input/output units 21 to 23 and light rays output from the plurality of input/output units 21 to 23 are approximately parallel to one another. However, embodiments are not limited to this example, and the light rays input to the plurality of input/output units 21 to 23 and the light rays output from the plurality of input/output units 21 to 23 need not always be approximately parallel to one another.

The array lens member 30 is optically connected to the optical device 20. The array lens member 30 includes a plurality of parallel lens units 31 to 33. The lens units 31 to 33 are, for example, convex lenses and have collimating functions and condensing functions. If the lens units 31 to 33 have the collimating functions, the lens units 31 to 33 may also be referred to as collimators or collimator lenses.

The plurality of lens units 31 to 33 are arranged (aligned) in the Y direction. However, embodiments are not limited to this example, and the plurality of lens units 31 to 33 may be arranged in a slightly deviated manner in the X direction.

Optical axes of the plurality of lens units 31 to 33 are arranged at equal intervals in the Y direction. However, embodiments are not limited to this example, and the interval between the optical axes of the plurality of input/output units 21 to 23 need not be an equal distance.

The optical axes of the plurality of lens units 31 to 33 are arranged so as to be separated from the base surface 10a by equal distances in the Z direction. However, embodiments are not limited to this example, and the distances of the optical axes of the plurality of lens units 31 to 33 from the base surface 10a may be different from one another.

The entire array lens member 30 may be made of, for example, a transparent material, such as glass, a synthetic resin material, or silicon, that transmits light. However, embodiments are not limited to this example, and at least a part including the lens units 31 to 33 of the array lens member 30 may be made of a material that transmits light. Here, transparent means that light input to the input/output units 21 to 23 and light output from the input/output units 21 to 23 is transmitted.

Profiles of refractive surfaces 31a to 33a of the lens units 31 to 33 may be different from one another. In the present embodiment, as one example, profiles of the lens units 31 and 33 for which corresponding correction optical elements 41 and 43 are provided are different from a profile of the lens units 32 for which a corresponding correction optical element is not provided. Meanwhile, "the corresponding correction optical elements 41 and 43 are provided" for the lens units 31 and 33 means that the correction optical elements 41 and 43 are present through which light that has not yet passed through or that has already passed through the lens units 31 and 33 passes, and "the corresponding correction optical elements 41 and 43 are not provided" for the lens unit 32 means that the corresponding correction optical element is not present through which light that has not yet passed through or that has already passed through the lens units 32 passes. The lens units 31 and 33 are one example of a first lens unit, and the lens unit 32 is one example of a second lens unit.

The correction optical elements 41 and 43 are arranged at positions opposite to the optical device 20 across the array lens member 30. The correction optical element 41 is arranged so as to correspond to the lens unit 31, and the correction optical element 43 is arranged so as to correspond to the lens unit 33. The correction optical element 41 is separated from the lens unit 31 in the X direction, and the correction optical element 43 is separated from the lens unit 33 in the X direction.

The correction optical elements 41 and 43 are, in the present embodiment, lenses as one example.

The plurality of correction optical elements 41 and 43 are arranged approximately parallel to each other in the Y direction. However, embodiments are not limited to this example, and the plurality of correction optical elements 41 and 43 may be arranged in a slightly deviated manner in the X direction.

An optical path length between the lens unit 31 and the correction optical element 41 and an optical path length between the lens unit 33 and the correction optical element 43 are approximately the same. However, embodiments are not limited to this example, and the optical path lengths between the plurality of correction optical elements 41 and 43 and the corresponding lens units 31 and 33 may be different from each other.

Furthermore, optical axes of the plurality of correction optical elements 41 and 43 are arranged so as to be separated from the base surface 10a by approximately the same distances in the Z direction. However, embodiments are not limited to this example, and the distances of the optical axes of the plurality of correction optical elements 41 and 43 from the base surface 10a may be different from each other.

The correction optical elements 41 and 43 correct light that has not yet passed through or that has already passed through the corresponding lens units 31 and 33 (hereinafter, simply referred to as light that passes through the lens units 31 and 33). The correction optical elements 41 and 43 correct, for example, positions of optical paths, directions, beam diameters, or the like. The array lens member 30 includes the plurality of lens units 31 to 33, and the optical device 20 includes the plurality of input/output units 21 to 23. If each of the lens units 31 to 33 is a different member, it is possible to arrange the plurality of lens units 31 to 33 in accordance with arrangement of the plurality of input/output units 21 to 23 in the optical device 20. However, in the present embodiment, the plurality of lens units 31 to 33 are integrated with the array lens member 30, and therefore, if the input/output units 21 to 23 in the optical device 20 are misaligned with the plurality of lens units 31 to 33 in the array lens member 30 due to manufacturing variation or the like, a deviation from expected values (for example, optimal values, design values, median values of tolerance ranges, or the like) of optical paths and beam diameters of a plurality of light rays that pass through the plurality of lens units 31 to 33 may increase depending on the misalignment, and it may be difficult to individually prevent the deviation. In this regard, in the present embodiment, the correction optical elements 41 and 43 that correct the optical paths and the beam diameters are arranged, so that it is possible to prevent a deviation from the expected values of the optical paths and the beam diameters of a plurality of light rays that pass through the plurality of lens units 31 to 33.

Furthermore, if a pitch in an arrangement direction of the plurality of lens units 31 to 33, in other words, a pitch in the Y direction, is small, a hand or a tool that holds the correction optical elements 41 and 43 is likely to interfere with peripheral components, so that it becomes difficult to mount the correction optical elements 41 and 43 on the substrate 10. In this regard, in the present embodiment, the correction optical element corresponding to the lens unit 32 is not present, so that it is possible to arrange the correction optical elements 41 and 43 such that the correction optical elements 41 and 43 are further separated from each other in the Y direction as compared to a case in which the correction optical element corresponding to the lens unit 32 is present, and it is possible to achieve an advantage in that the correction optical elements 41 and 43 may more easily or more smoothly be mounted on the substrate 10.

Moreover, as described above, in the present embodiment, the profiles of the refractive surfaces 31a and 33a of the lens units 31 and 33 are different from the profile of the refractive surface 32a of the lens unit 32. With this configuration, for example, it is possible to set approximately the same optical characteristics, such as a focal distance, among a synthetic optical system including the lens unit 31 and the correction optical element 41, the lens unit 32, and a synthetic optical system including the lens unit 33 and the correction optical element 43.

Figure 2:
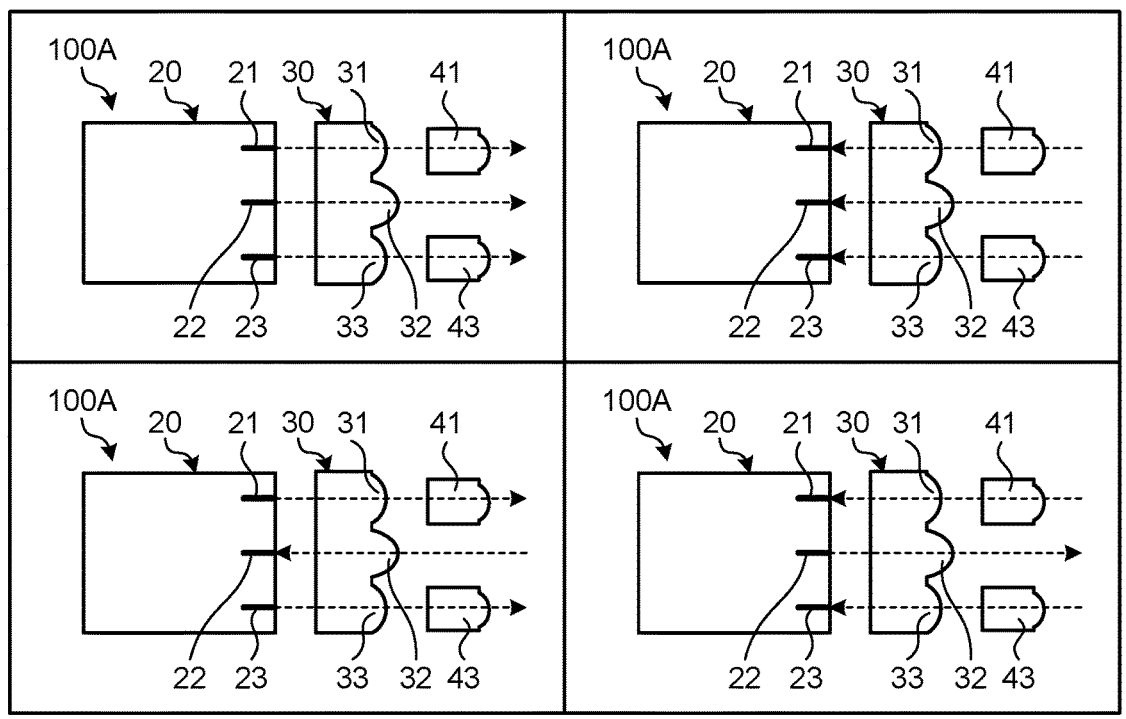
FIG. 2 is an illustrative and schematic plan view illustrating an example of orientation of light in the optical module according to the first embodiment.

FIG. 2 is a schematic plan view illustrating four configuration examples of the optical device 20 in the optical module 100A according to the present embodiment. An upper left in FIG. 2 illustrates a configuration example in which all of the input/output units 21 to 23 are optical output units, an upper right in FIG. 2 illustrates a configuration example in which all of the input/output units 21 to 23 are optical input units, a lower left in FIG. 2 illustrates a configuration example in which the input/output units 21 and 23 are optical output units and the input/output unit 22 is an optical input unit, and a lower right in FIG. 2 illustrates a configuration example in which the input/output unit 22 is an optical output unit and the input/output units 21 and 23 are optical input units. It is possible to apply the optical device 20 of the present embodiment to various optical input/output modes as illustrated in FIG. 2 and various optical input/output modes other than those illustrated in FIG. 2.

Thus, as described above, in the present embodiment, the optical module 100A includes the optical device 20, the array lens member 30, and the correction optical elements 41 and 43. The array lens member 30 includes the plurality of parallel lens units 31 to 33. Each of the correction optical elements 41 and 43 corrects light that passes through each of the lens units 31 and 33.

Furthermore, in the present embodiment, each of the correction optical elements 41 and 43 corrects at least one of the optical path and the beam diameter of light that passes through each of the lens units 31 and 33.

With this configuration, for example, it is possible to prevent, by the correction optical elements 41 and 43, a deviation from the expected values of spatial characteristics of light that passes through each of the lens units 31 and 33, for example, a deviation from the expected values of the optical paths and the beam diameters.

Moreover, in the present embodiment, the array lens member 30 includes the lens units 31 and 33 (first lens unit) for which the corresponding correction optical elements 41 and 43 are provided, and the lens unit 32 (second lens unit) for which the corresponding correction optical element is not provided.

With this configuration, it is possible to reduce the number of the correction optical elements as compared to a configuration in which the correction optical elements are arranged for all of the lens units 31 to 33. Therefore, for example, it is possible to reduce the number of components of the optical module 100A, and reduce time, effort, and cost for manufacturing the optical module 100A.

Furthermore, in the present embodiment, the lens units 31 and 33 (first lens unit) for which the corresponding correction optical elements 41 and 43 are provided and the lens unit 32 (second lens unit) for which the corresponding correction optical element is not provided are arranged adjacent to each other in the arrangement direction of the lens units 31 to 33.

With this configuration, for example, a space that is adjacent to the correction optical elements 41 and 43 in the Y direction is provided on the substrate 10, so that it is possible to easily grasp the correction optical elements 41 and 43 by a grasping member, such as a robot hand or tweezers, and it is possible to more easily or more smoothly mount the correction optical elements 41 and 43 on the substrate 10.

Moreover, in the present embodiment, the array lens member 30 includes the plurality of lens units 31 to 33 for which the profiles of the refractive surfaces 31a to 33a are different.

With this configuration, for example, it is possible to set approximately the same optical characteristics, such as a focal distance, among a synthetic optical system including the lens unit 31 and the correction optical element 41, the lens unit 32, and a synthetic optical system including the lens unit 33 and the correction optical element 43.

Furthermore, in the present embodiment, for example, a pitch between the plurality of lens units 31 to 33 (pitch between optical axes) is, for example, equal to or smaller than 2 millimeters (mm), is preferably equal to or larger than 0.2 mm and equal to or smaller than 2 mm, and is more preferably equal to or larger than 0.2 mm and equal to or smaller than 1 mm. With this configuration, it is possible to prevent an increase in a size of the array lens member 30, and resultantly, a size of the optical module 100A, in the Y direction, in other words, in the arrangement direction of the lens units 31 to 33.

Moreover, in the present embodiment, for example, a curvature radius of each of the refractive surfaces 31a to 33a of the lens units 31 to 33 is, for example, equal to or larger than 0.2 mm and equal to or smaller than 2 mm. This is because, due to a wide emission beam angle from a device, a limitation in layout of components, or the like, a collimated beam diameter is limited, and a steep refractive index gradient is needed. With this configuration, it is possible to form a desired optical path in a narrow region.

Furthermore, in the present embodiment, for example, a difference between the curvature radii of the refractive surfaces 31a to 33a of the plurality of lens units 31 to 33 is equal to or larger than 0.05 mm or a difference between aspherical coefficients is equal to or larger than 0.3. This means that the lens units 31 to 33 have different optical characteristics. With this configuration, for example, it is possible to design correction lenses corresponding to the respective lens units 31 to 33 with high accuracy, or it is possible to more flexibly select necessity of the correction lenses.

Moreover, in the present embodiment, as illustrated in the example in FIG. 2, the array lens member 30 may include the lens unit (the light receiving lens unit; for example, the lens unit 32 in the example in the lower left in FIG. 2) that transmits light that enters the optical device 20, and the lens units (light emitting lens units; for example, the lens units 31 and 33 in the example in the lower left in FIG. 2) that transmit light that is output from the optical device 20.

With this configuration, for example, it is possible to adopt the optical module 100A of the present embodiment to a configuration including the optical device 20 that receives input light and that outputs light.

Furthermore, in the present embodiment, for example, an interval between the optical axis of the lens unit (the light receiving lens unit; for example, the lens unit 32 in the example in the lower left in FIG. 2) that transmits light that enters the optical device 20 and the optical axes of the lens units (light emitting lens units; for example, the lens units 31 and 33 in the example in the lower left in FIG. 2) that transmit light that is output from the optical device 20 is equal to or smaller than 1.5 mm. With this configuration, it is possible to prevent an increase in the size of the array lens member 30, and resultantly, the size of the optical module 100A, in the Y direction, in other words, in the arrangement direction of the lens units 31 to 33.

Moreover, in the present embodiment, the correction optical elements 41 and 43 are lenses.

With this configuration, it is possible to correct spatial characteristics, such as the optical paths and the beam diameters, of light that passes through each of the lens units 31 and 33 by adjusting the positions or the orientation of the correction optical elements 41 and 43.

Furthermore, in the present embodiment, for example, a curvature radius of each of refractive surfaces 41a and 43a of lenses as the correction optical elements 41 and 43 is equal to or larger than five times the curvature radius of each of the refractive surfaces 31a to 33a of the lens units 31 to 33 and equal to or smaller than twenty times the curvature radius of each of the refractive surfaces 31a to 33a, and more preferably, equal to or larger than eight times and equal to or smaller than twelve times the curvature radius of each of the refractive surfaces 31a to 33a. This numerical range is obtained by calculations and experiments. This is determined because, when positional misalignment of the lens units 31 to 33 is to be corrected by the correction optical elements 41 and 43 that are the lenses with the steep refractive index gradients, and if the curvature radii are excessively small, variation in the optical characteristics due to positional misalignment of the correction optical elements 41 and 43 increases, and if the curvature radii are excessively large, it becomes difficult to achieve the correction effect. With this setting, it is possible to compensate for a coupling loss.

First Modification

Figure 3:
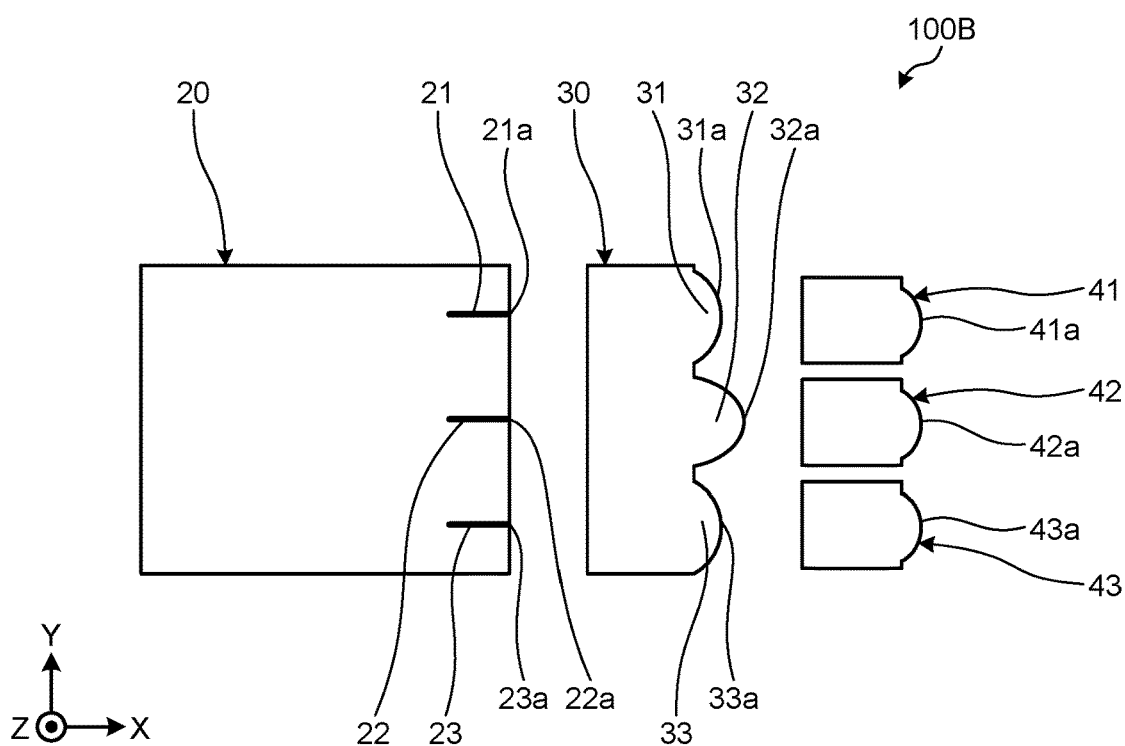
FIG. 3 is an illustrative and schematic plan view of an optical module according to a first modification.

FIG. 3 is a plan view of an optical module 100B according to a first modification. As illustrated in FIG. 3, in the present modification, the correction optical element 41 is arranged so as to correspond to the lens unit 31, a correction optical element 42 is arranged so as to correspond to the lens unit 32, and the correction optical element 43 is arranged so as to correspond to the lens unit 33.

With this configuration, for example, it is possible to correct a deviation from the expected values of the spatial characteristics, such as a deviation from the expected values of the optical paths and the beam diameters, of light that pass through all of the lens units 31 and 33 by the correction optical element 41 to 43.

Second Modification

Figure 4:
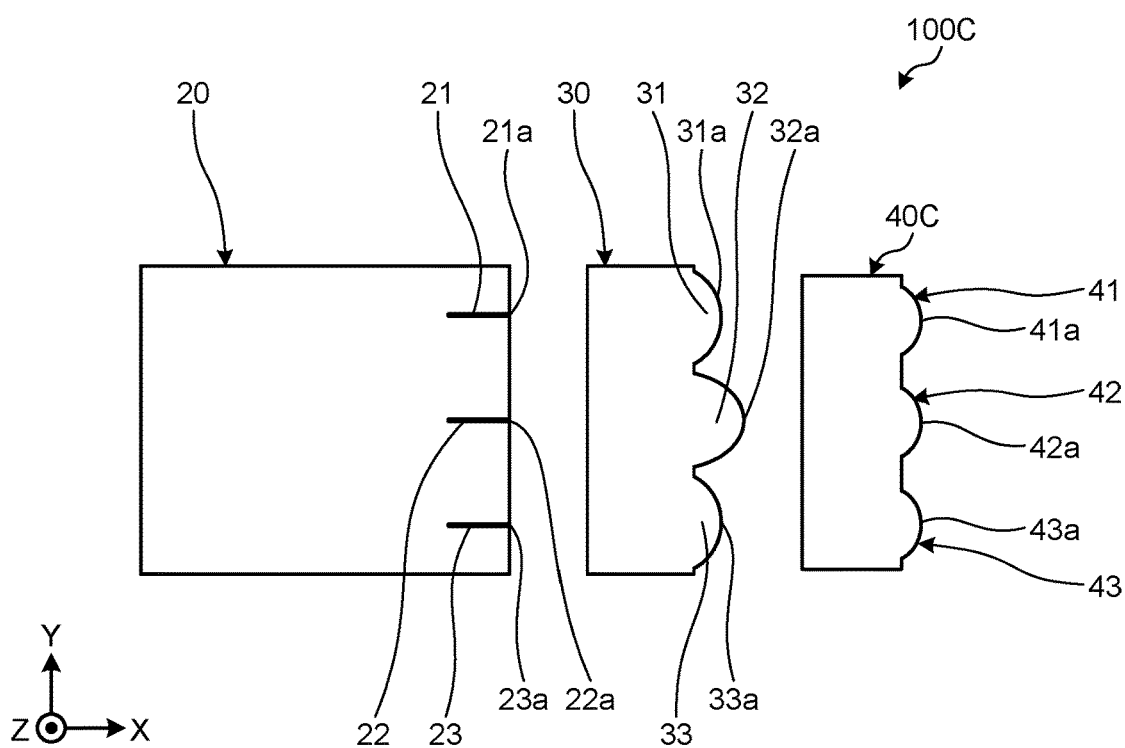
FIG. 4 is an illustrative and schematic plan view of an optical module according to a second modification.

FIG. 4 is a plan view of an optical module 100C according to a second modification. As illustrated in FIG. 4, in the present modification, the optical module 100C includes an array correction member 40C in which the correction optical element 41 to 43 that are lens units are integrated.

With this configuration, for example, it is possible to reduce time, effort, and cost for mounting the correction optical elements 41 to 43 as compared to a configuration in which the correction optical elements 41 to 43 are separated.

Third Modification

Figure 5:
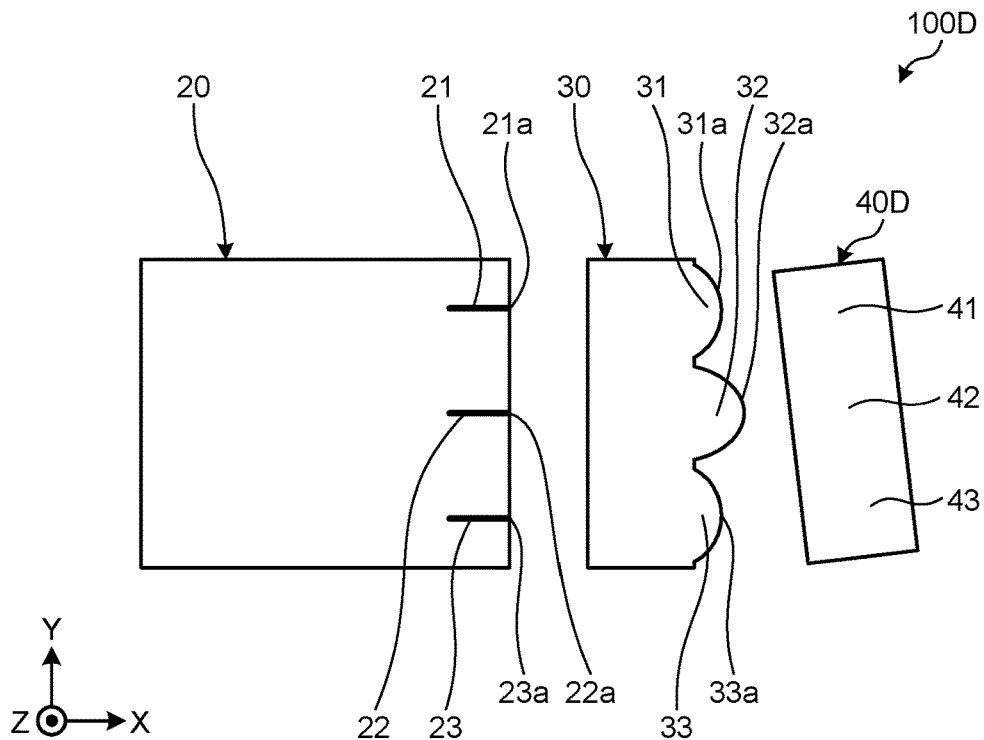
FIG. 5 is an illustrative and schematic plan view of an optical module according to a third modification.

FIG. 5 is a plan view of an optical module 100D according to a third modification. As illustrated in FIG. 5, in the present modification, the optical module 100D includes an array correction member 40D in which the correction optical elements 41 to 43 that are prism units are integrated. The array correction member 40D is able to perform translation of light, which passes through each of the lens units 31 to 33, in the Y direction.

With this configuration, for example, it is possible to reduce time, effort, and cost for mounting the correction optical elements 41 to 43 as compared to a configuration in which the correction optical elements 41 to 43 are separated.

Fourth Modification

Figure 6:
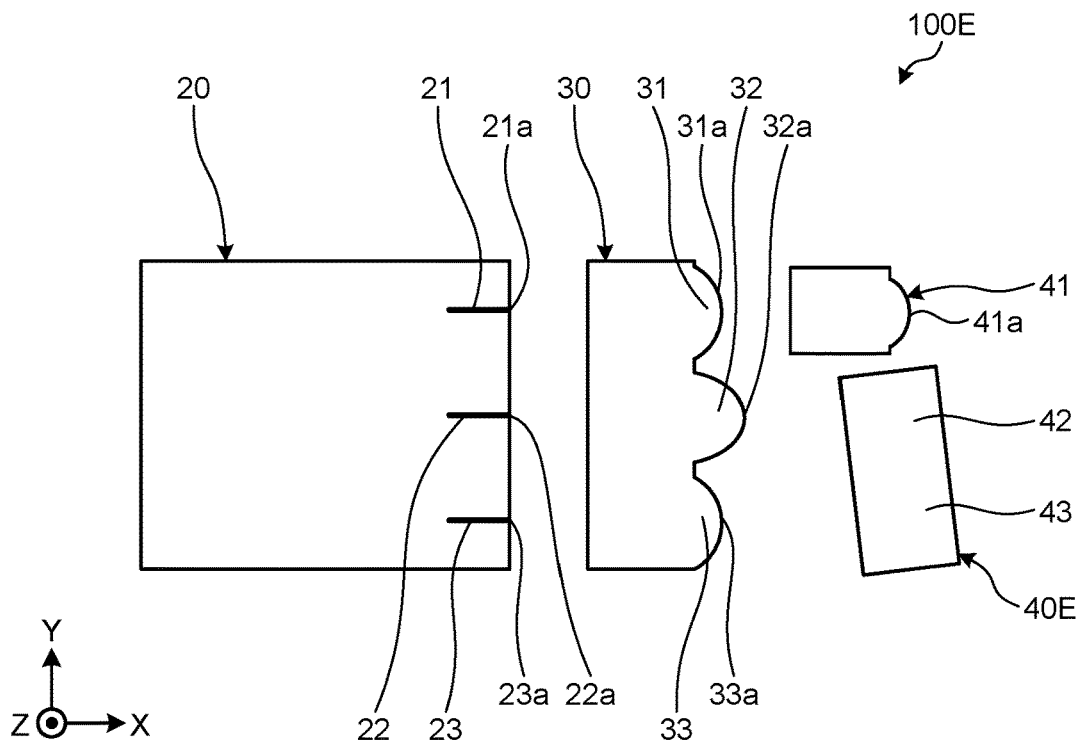
FIG. 6 is an illustrative and schematic plan view of an optical module according to a fourth modification.

FIG. 6 is a plan view of an optical module 100E according to a fourth modification. As illustrated in FIG. 6, in the present modification, the optical module 100E includes the correction optical element 41 that is a lens and an array correction member 40E in which the correction optical elements 42 and 43 that are prism units are integrated. The array correction member 40D is able to perform translation of light, which passes through each of the lens units 32 and 33, in the Y direction.

With this configuration, for example, it is possible to more preferably correct light that passes through each of the lens units 31 to 33.

Fifth Modification

Figure 7:
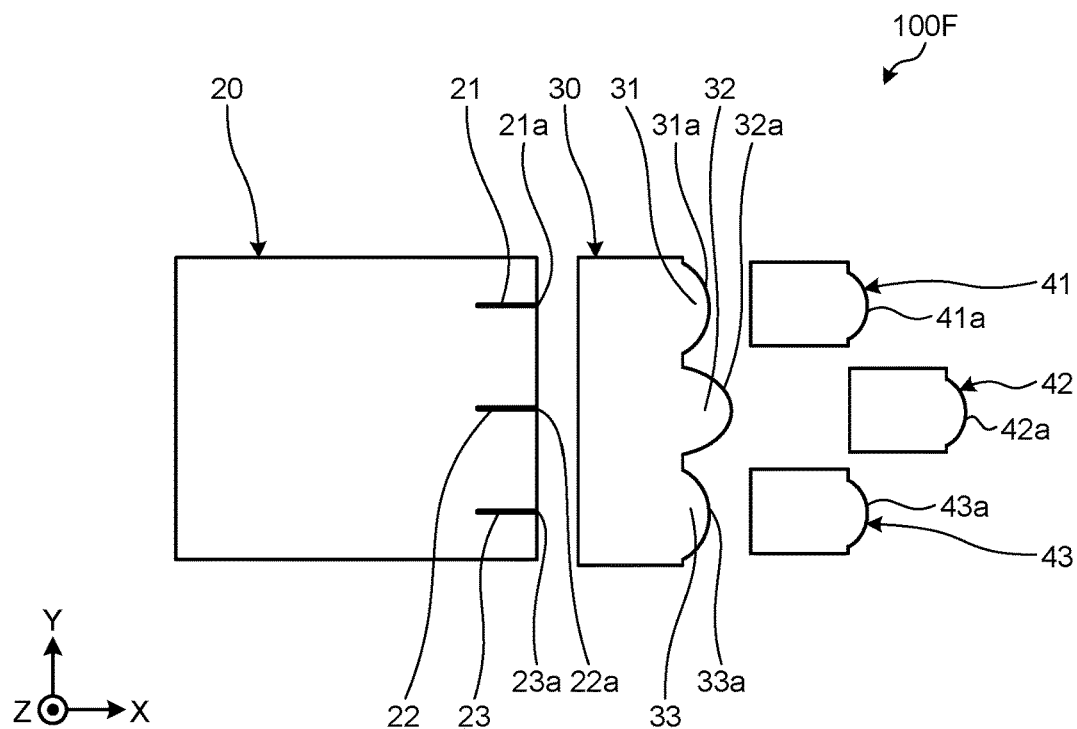
FIG. 7 is an illustrative and schematic plan view of an optical module according to a fifth modification.

FIG. 7 is a plan view of an optical module 100F according to a fifth modification. As illustrated in FIG. 7, in the present modification, the correction optical elements 41 to 43 that are lenses are arranged for the respective lens units 31 to 33.

As illustrated in FIG. 7, the optical module 100F includes the plurality of correction optical elements 41 to 43 with different optical path lengths from the lens units 31 to 33. The optical path length between the lens unit 32 and the correction optical element 42 is longer than the optical path length of each of the lens units 31 and 33 and each of the correction optical elements 41 and 43.

With this configuration, for example, spaces that are adjacent to the correction optical element 42 in the X direction are provided on the substrate 10, so that it is possible to easily grasp the correction optical element 42 by a grasping member, such as a robot hand or tweezers, and it is possible to more easily or more smoothly mount the correction optical element 42 on the substrate 10.

Furthermore, from the viewpoint as described above, it is preferable that a difference between the optical path length between the lens unit 32 and the correction optical element 42 and the optical path length between each of the lens units 31 and 33 and each of the correction optical elements 41 and 43 is equal to or larger than 0.1 mm.

Moreover, in the present modification, the profiles of the refractive surfaces 31a and 33a of the lens units 31 and 33 are different from the profile of the refractive surface 32a of the lens unit 32. With this configuration, for example, it is possible to set approximately the same optical characteristics, such as a focal distance, among a synthetic optical system including the lens unit 31 and the correction optical element 41, the lens unit 32, and a synthetic optical system including the lens unit 33 and the correction optical element 43.

Sixth Modification

Figure 8:
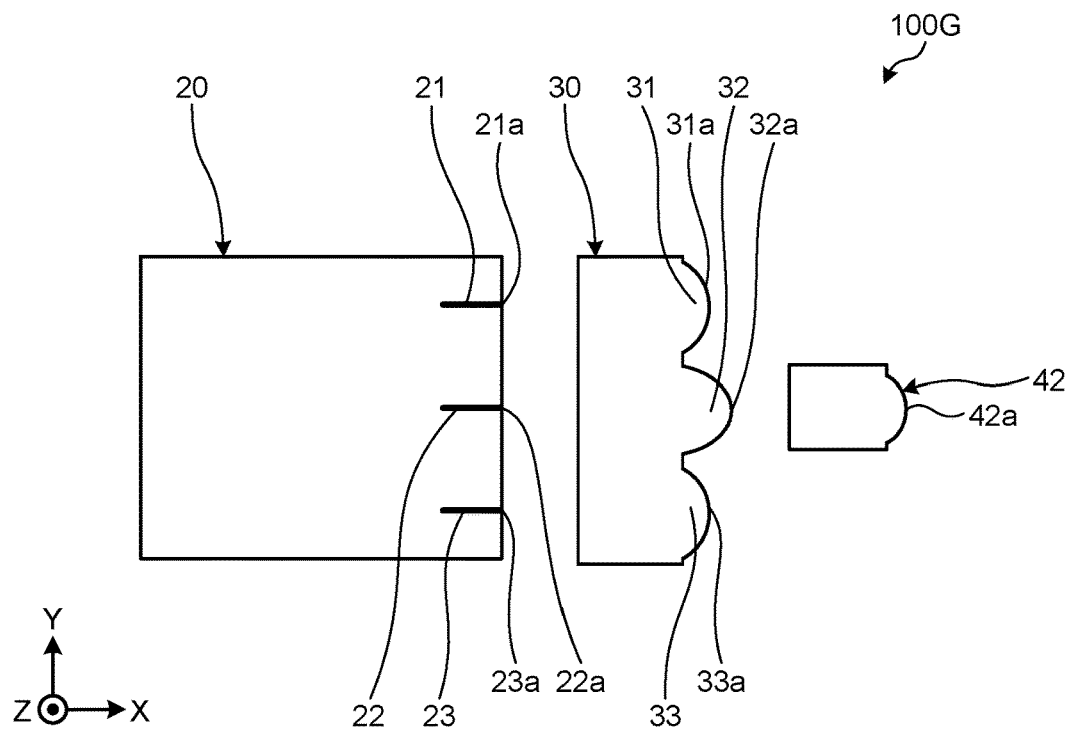
FIG. 8 is an illustrative and schematic plan view of an optical module according to a sixth modification.

FIG. 8 is a plan view of an optical module 100G according to a sixth modification. As illustrated in FIG. 8, in the present modification, the correction optical element 42 that is a lens is arranged for only the lens unit 32.

With this configuration, for example, spaces that are adjacent to the correction optical element 42 in the Y direction are provided on the substrate 10, so that it is possible to easily grasp the correction optical element 42 by a grasping member, such as a robot hand or tweezers, and it is possible to more easily or more smoothly mount the correction optical element 42 on the substrate 10.

Furthermore, in the present modification, the profiles of the refractive surfaces 31a and 33a of the lens units 31 and 33 are different from the profile of the refractive surface 32a of the lens unit 32. With this configuration, for example, it is possible to set approximately the same optical characteristics, such as a focal distance, among the lens units 31, a synthetic optical system including the lens units 32 and the correction optical element 42, and the lens units 33.

Seventh Modification

Figure 9:
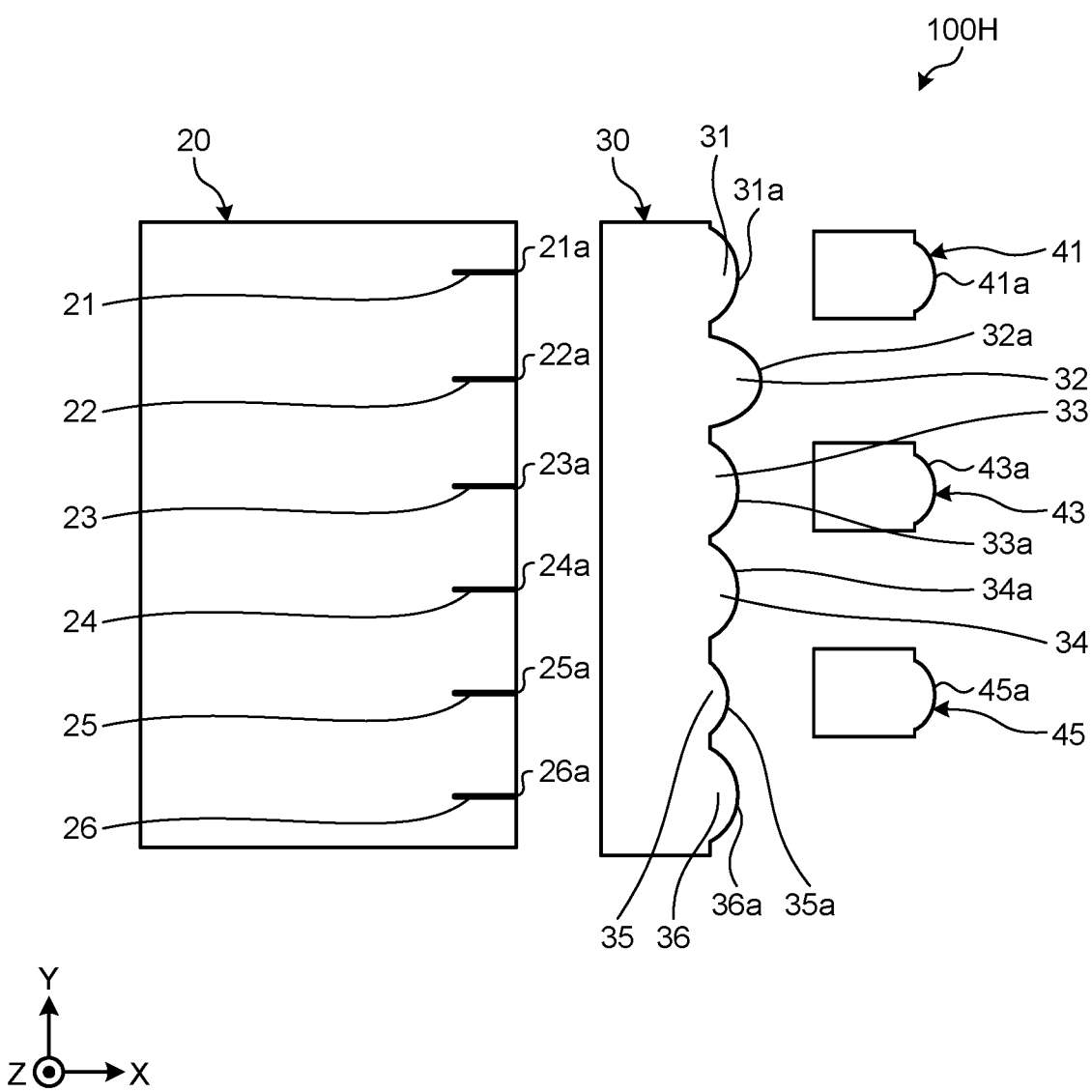
FIG. 9 is an illustrative and schematic plan view of an optical module according to a seventh modification.

FIG. 9 is a plan view of an optical module 100H according to a seventh modification. As illustrated in FIG. 9, in the present modification, the number of the input/output units 21 to 26 in the optical device 20 is six, and the number of the lens units 31 to 36 in the array lens member 30 is six. In contrast, the number of the correction optical elements 41, 43, and 45 that are lenses is three. In this manner, even in the configuration in which the different numbers of units are provided, it is possible to achieve the same effects as those of the embodiment and the modifications as described above.

Eighth to Tenth Modification

Figure 10:
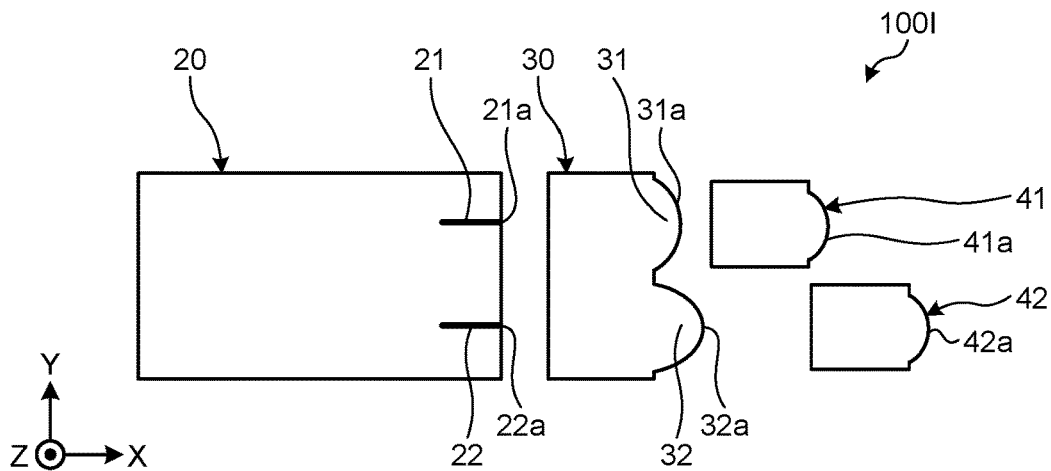
FIG. 10 is an illustrative and schematic plan view of an optical module according to an eighth modification.
Figure 11:
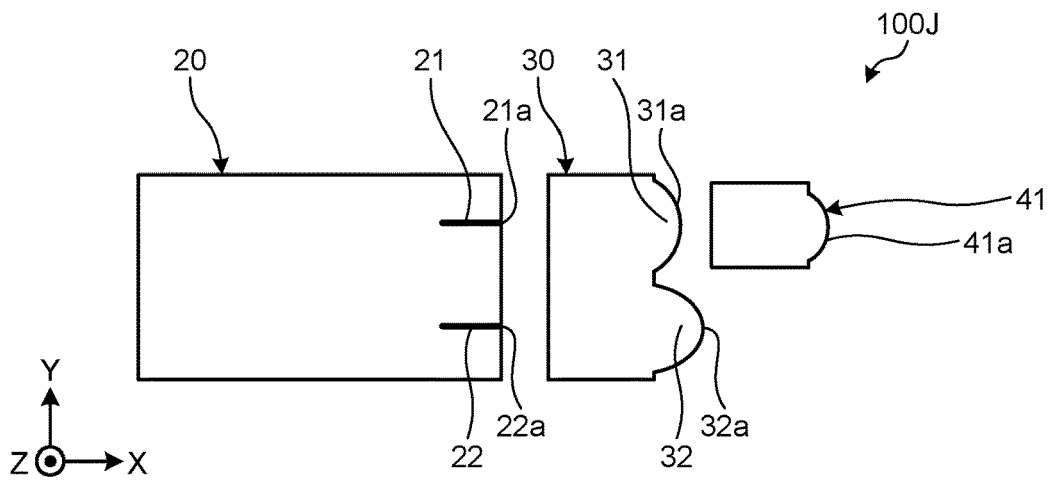
FIG. 11 is an illustrative and schematic plan view of an optical module according to a ninth modification.
Figure 12:
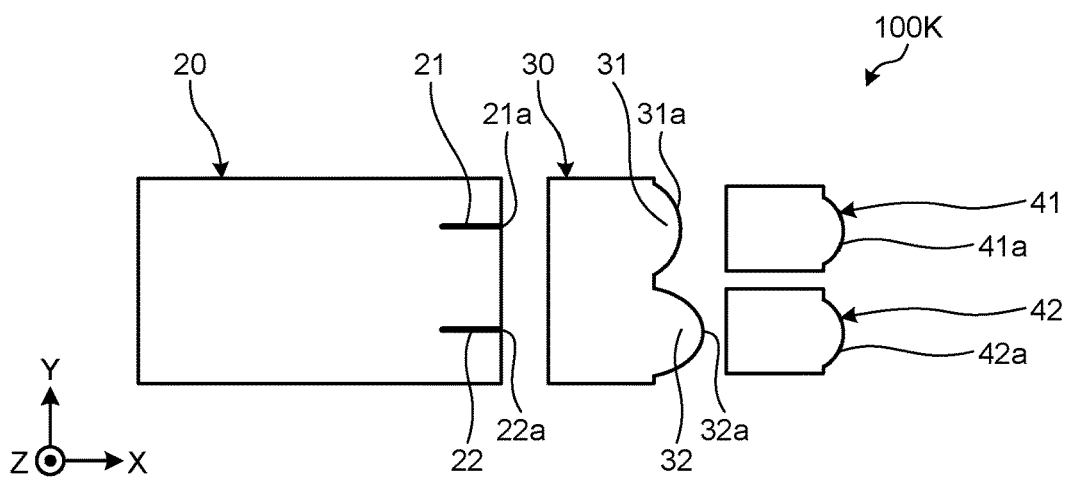
FIG. 12 is an illustrative and schematic plan view of an optical module according to a tenth modification.

FIG. 10 is a plan view of an optical module 100I according to an eighth modification, FIG. 11 is a plan view of an optical module 100J according to a ninth modification, and FIG. 12 is a plan view of an optical module 100K according to a tenth modification. As illustrated in FIGS. 10 to 12, in these modifications, the number of the input/output units 21 and 22 in the optical device 20 and the number of the lens units 31 and 32 in the array lens member 30 are two. In contrast, the number of the correction optical elements 41 and 42 that are lenses is one or two. In this manner, even in the configuration in which the different numbers of units are provided, it is possible to achieve the same effects as those of the embodiment and the modifications as described above. Meanwhile, the number of the input/output units 21 to 26 and the number of the lens units 31 to 36 are not limited to two, three, or six, but may be four or five, or may be seven or larger.

Eleventh and Twelfth Modifications

Figure 13:
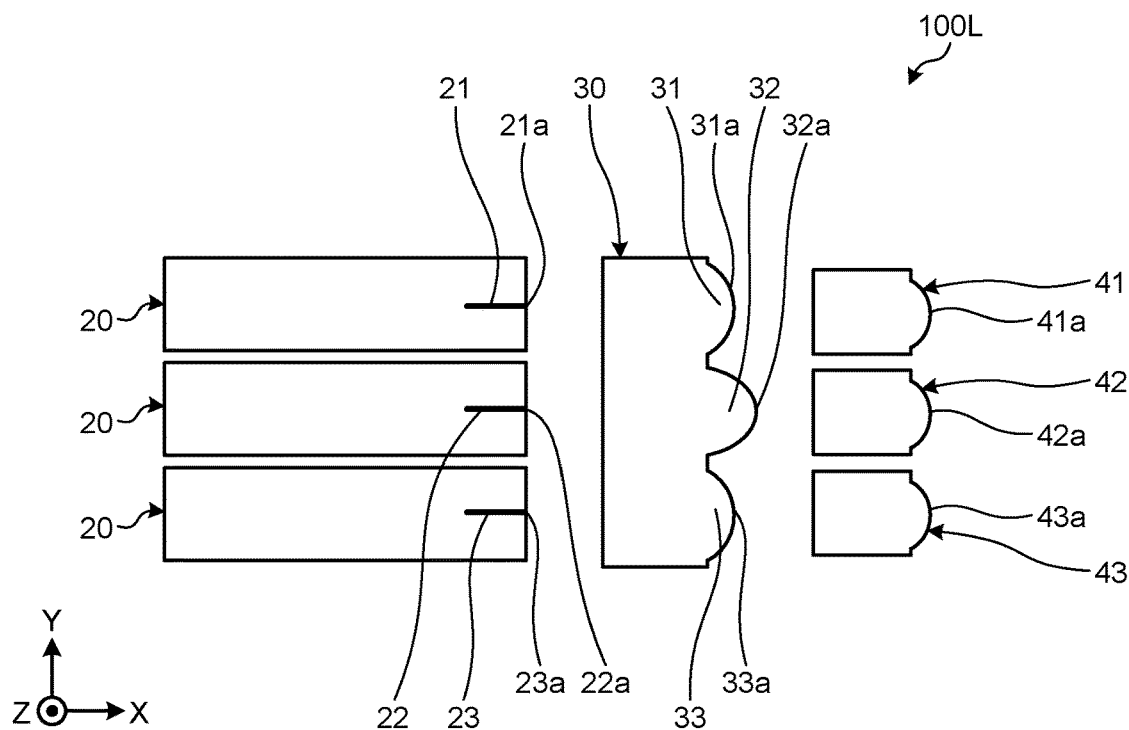
FIG. 13 is an illustrative and schematic plan view of an optical module according to an eleventh modification.
Figure 14:
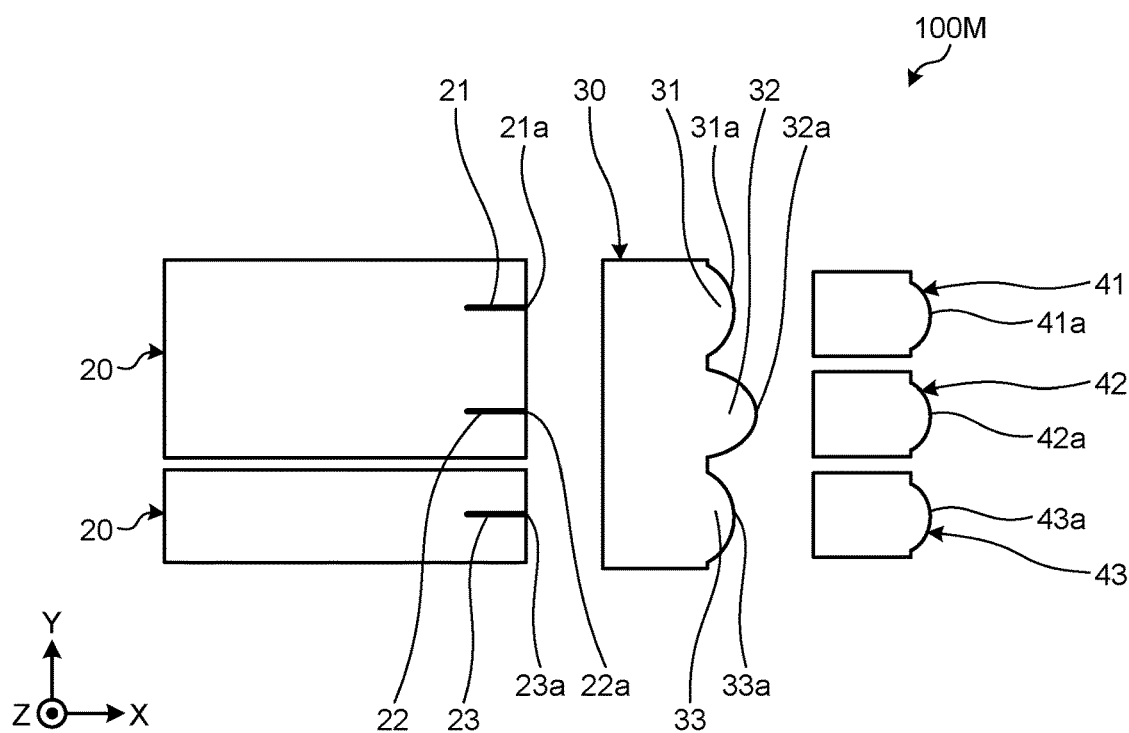
FIG. 14 is an illustrative and schematic plan view of an optical module according to a twelfth modification.

FIG. 13 is a plan view of an optical module 100L according to an eleventh modification, and FIG. 14 is a plan view of an optical module 100M according to a twelfth modification. As illustrated in FIG. 13 and FIG. 14, in these modifications, the plurality of optical devices 20, which are not integrated with each other but are independent of each other, are arranged. The optical module 100L illustrated in FIG. 13 includes the three optical devices 20 each including one of the input/output units 21 to 23, and the optical module 100M illustrated in FIG. 14 includes the optical device 20 including the input/output units 21 and 22 and the optical device 20 including the input/output unit 23. In this manner, even in the configuration in which the plurality of optical devices 20 are provided, it is possible to achieve the same effects as those of the embodiment and the modifications as described above.

Second Embodiment

Figure 15:
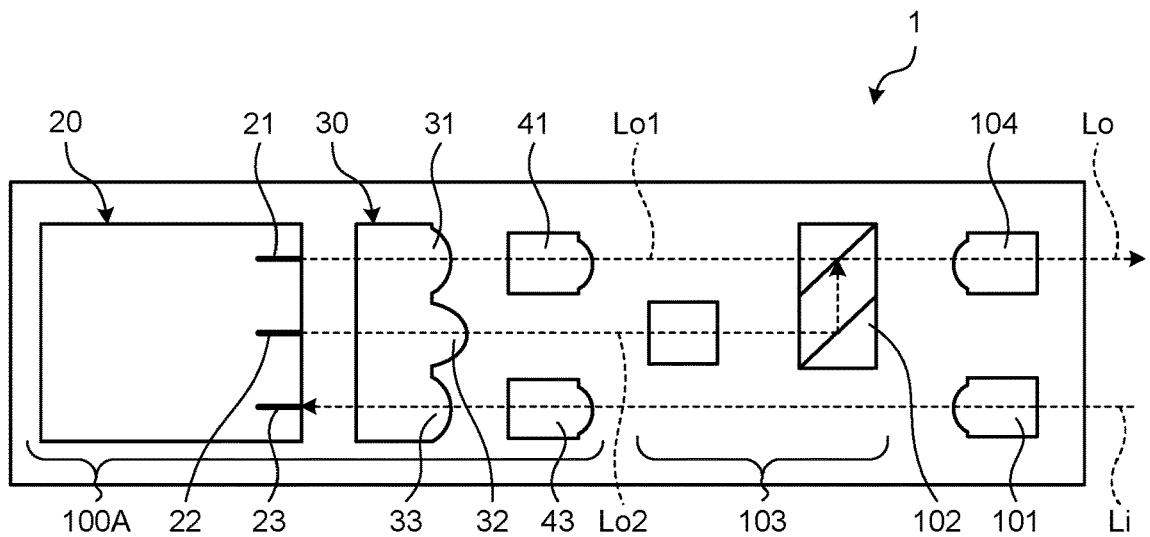
FIG. 15 is an illustrative and schematic plan view of an optical device including an optical module according to a second embodiment.

FIG. 15 is a plan view of an optical device 1 including an optical module 100A according to a second embodiment. The optical module 100A has the same configuration as that of the first embodiment. Further, in the optical module 100A, light is input to the input/output unit 23 of the optical device 20, and light is output from the input/output units 21 and 22 of the optical device 20. The optical device 20 of the optical module 100A is a modulator.

Light (input light Li) emitted from an input optical fiber (not illustrated) is input to the optical device 20 that is a modulator through a lens 101 and the lens unit 33 of the array lens member 30.

The optical device 20 is, for example, a Mach-Zehnder (MZ) phase modulator in which indium phosphide (InP) is used as a constituent material, and which is a well-known optical device that is driven by a modulator driver (not illustrated) and that functions as an IQ modulator. The optical device 20 may have the same configuration as a configuration disclosed in, for example, International Publication No. 2016/021163.

The optical device 20 modulates the input light Li and outputs modulated light Lo1 and Lo2 whose polarization planes are perpendicular to each other. Each of the modulated light Lo1 and Lo2 is linearly-polarized light and subjected to IQ modulation. The modulator driver that operates the optical device 20 includes, for example, an integrated circuit (IC). Operation of the modulator driver is controlled by a controller (not illustrated).

The lens unit 31 collimates the modulated light Lo1 and inputs the modulated light Lo1 to a polarization multiplexing unit 103. Further, the lens unit 32 collimates the modulated light Lo2 and inputs the modulated light Lo2 to the polarization multiplexing unit 103. The polarization multiplexing unit 103 rotates the polarization plane of the modulated light Lo2, performs polarization multiplexing of the modulated light Lo1 and Lo2, and outputs output signal light Lo including the modulated light Lo1 and Lo2. The output signal light Lo that is output from the polarization multiplexing unit 103 is input to an end portion (not illustrated) of an output optical fiber through a lens 104.

According to the optical device 1 with the configuration as described above, the optical module 100A is provided, so that it is possible to obtain the effects that are achieved by the optical module 100A. Meanwhile, the optical module 100A may appropriately be replaced with the optical module of the modifications or a different optical module having the same configuration as the modifications. Furthermore, the optical device 1 need not always include the modulator.

Thirteenth Modification

Figure 16:
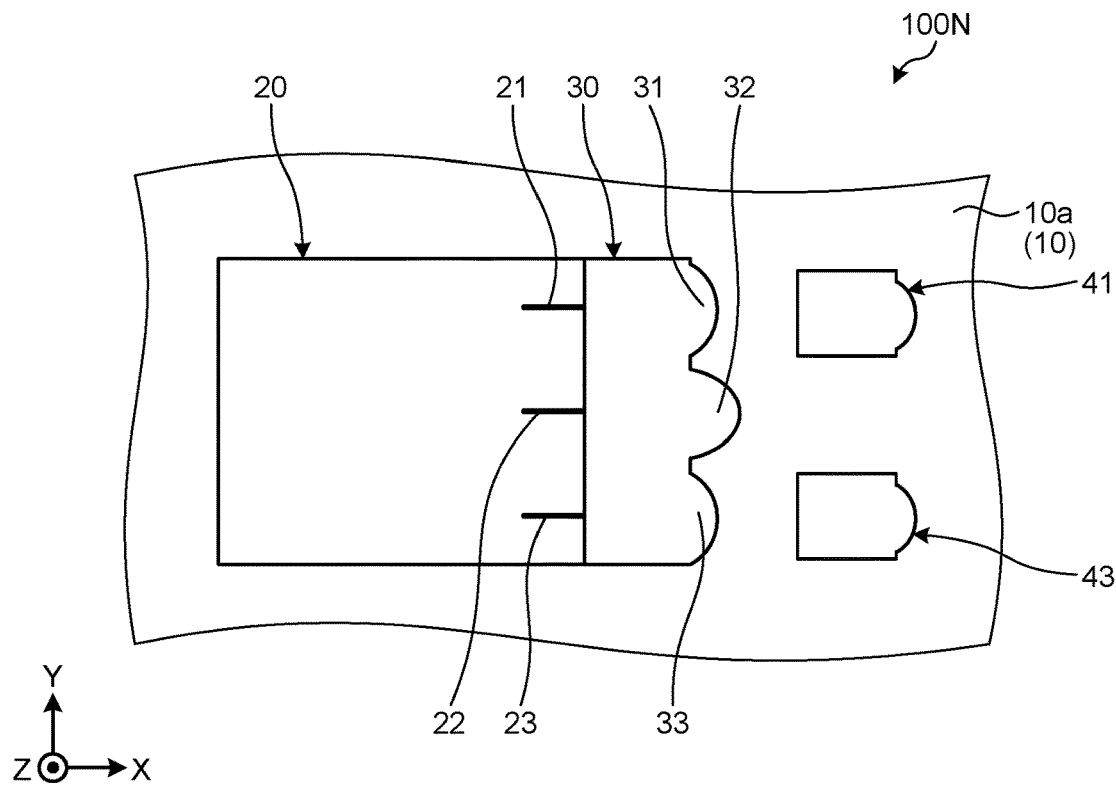
FIG. 16 is an illustrative and schematic plan view of an optical module according to a thirteenth modification.

FIG. 16 is a plan view of an optical module 100N according to a thirteenth modification that is one modification of the first embodiment. As illustrated in FIG. 16, the optical module 100N of the present modification has the same configuration as the first embodiment. However, in the present modification, the optical device 20 and the array lens member 30 come into contact with each other and are integrated with each other in the X direction. Even in the present modification, it is possible to achieve the same effects as those of the first embodiment. Furthermore, according to the present modification, for example, it is possible to achieve an advantage in that a size of the optical module 100N in the X direction may further be reduced.

Fourteenth Modification

Figure 17:
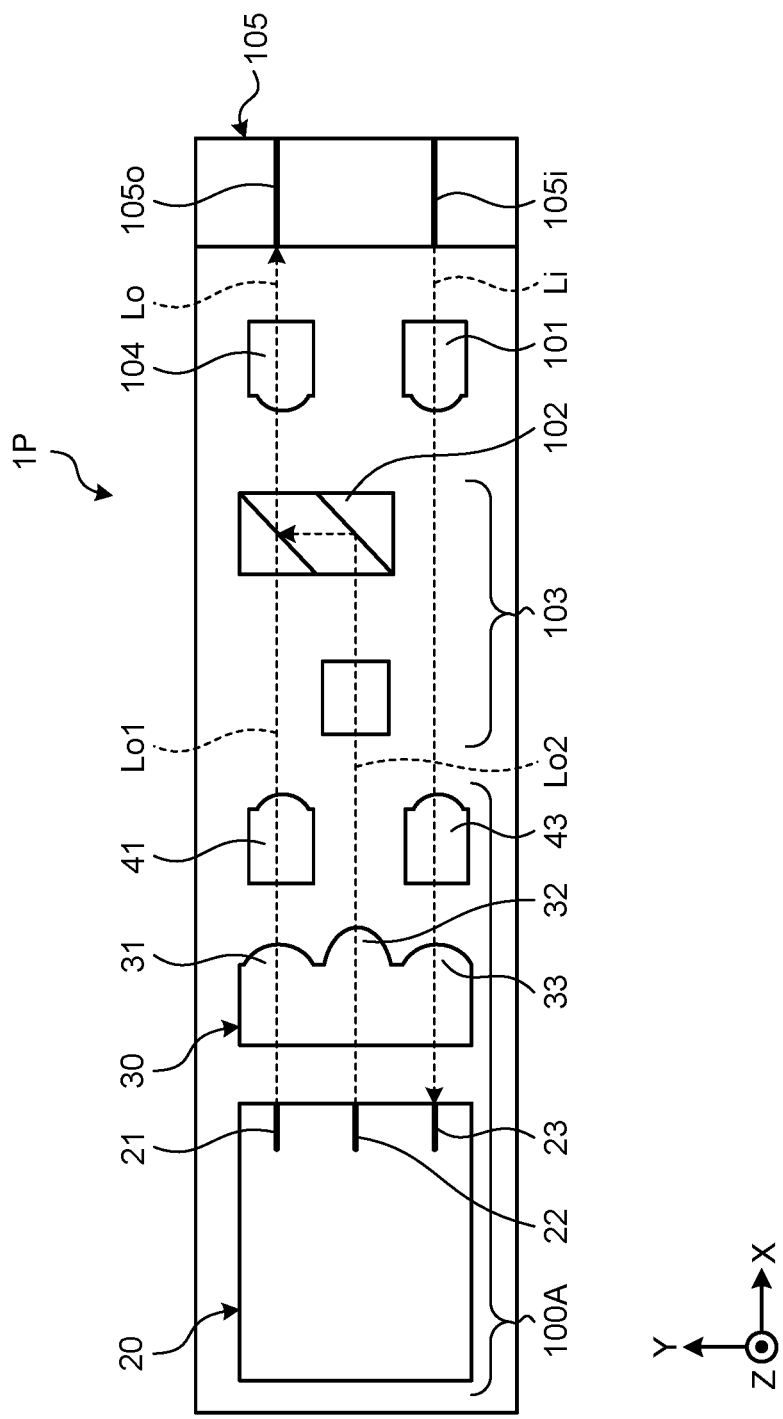
FIG. 17 is an illustrative and schematic plan view of an optical device including an optical module according to a fourteenth modification.

FIG. 17 is a plan view of an optical device 1P according to a fourteenth modification that is one modification of the second embodiment. As illustrated in FIG. 17, the optical device 1P of the present modification has the same configuration as the second embodiment. However, in the present modification, the optical device 1P includes an optical fiber array 105 (block) that includes an optical fiber 105i for transmitting the input light Li and an optical fiber 105o for transmitting the output signal light Lo. Even in the present modification, it is possible to achieve the same effects as those of the second embodiment as described above.

Fifteenth Modification

Figure 18:
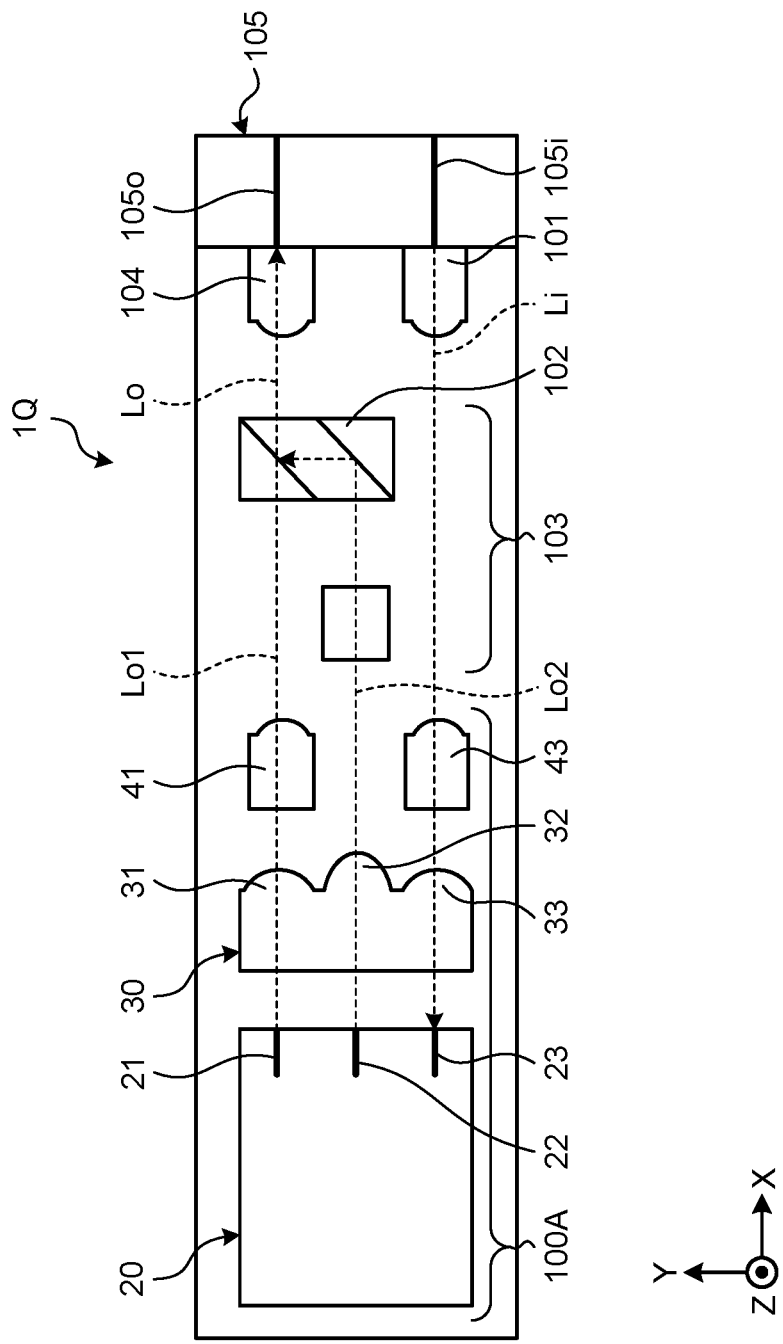
FIG. 18 is an illustrative and schematic plan view of an optical device including an optical module according to a fifteenth modification.

FIG. 18 is a plan view of an optical device 1Q according to a fifteenth modification that is one modification of the second embodiment. As illustrated in FIG. 18, the optical device 1Q of the present modification has the same configuration as the fourteenth modification. However, in the present modification, the lenses 101 and 104 come into contact with and integrated with the optical fiber array 105 in the X direction. Even in the present modification, it is possible to achieve the same effects as those of the fourteenth modification and the second embodiment. Furthermore, according to the present modification, for example, it is possible to achieve an advantage in that a size of the optical device 1Q in the X direction may further be reduced.

Thus, the embodiments and the modifications of the present disclosure have been described above, but the embodiments and the modifications are mere examples, and are not intended to limit the scope of the disclosure. The embodiments and the modifications may be embodied in various other forms, and various omission, replacement, combinations, and changes may be made without departing from the gist of the disclosure. Furthermore, specifications, such as the configurations and the shapes (structures, types, directions, models, sizes, lengths, widths, thicknesses, heights, numbers, arrangement, positions, materials, and the like) may appropriately be changed in various modes.

According to the present disclosure, for example, in an optical module and an optical device that include an array lens member having a plurality of parallel lens units, it is possible to correct light that passes through the lens units.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical module comprising:
   an optical device;
   an array lens member that integrally includes a plurality of parallel lens units optically connected to the optical device; and
   a correction optical element configured to correct light that passes through the lens units,
   wherein the lens units includes at least one of:
      a light receiving lens unit configured to transmit light that enters the optical device; and
      a light emitting lens unit configured to transmit light that is output from the optical device, and
   wherein an interval between an optical axis of the light receiving lens unit and an optical axis of the light emitting lens unit is equal to or smaller than 1.5 mm.

2. The optical module according to claim 1, wherein the correction optical element is configured to correct at least one of an optical path and a beam diameter of light that passes through the lens units.

3. The optical module according to claim 1, further comprising:
   a plurality of correction optical elements configured to function as the correction optical element, each of the plurality of correction optical element having different optical path lengths from the lens units.

4. The optical module according to claim 3, wherein the difference in the optical path lengths is equal to or larger than 0.1 millimeter.

5. The optical module according to claim 3, further comprising an array correction member integrally including the plurality of correction optical elements.

6. The optical module according to claim 1, wherein the lens units includes:
   a first lens unit for which the corresponding correction optical element is provided; and
   a second lens unit for which the corresponding correction optical element is not provided.

7. The optical module according to claim 6, wherein the first lens unit and the second lens unit are arranged adjacent to each other in an arrangement direction of the lens units.

8. The optical module according to claim 1, wherein the lens units have refractive surfaces with different profiles.

9. The optical module according to claim 1, wherein a pitch between the lens units in an arrangement direction is equal to or smaller than 2 mm.

10. The optical module according to claim 9, wherein a pitch between the lens units in the arrangement direction is equal to or larger than 0.2 mm and equal to or smaller than 2 mm.

11. The optical module according to claim 10, wherein a pitch between the lens units in the arrangement direction is equal to or larger than 0.2 mm and equal to or smaller than 1 mm.

12. The optical module according to claim 1, wherein each of the lens units has a refractive surface with a curvature radius that is equal to or larger than 0.2 mm and equal to or smaller than 2 mm.

13. The optical module according to claim 12, wherein the lens units have refractive surfaces for which a difference between curvature radii is equal to or larger than 0.05 mm or for which a difference between aspherical coefficients are equal to or larger than 0.3.

14. The optical module according to claim 1, wherein the correction optical element includes at least one lens.

15. The optical module according to claim 14, wherein a curvature radius of a refractive surface of a lens serving as the correction optical element is equal to or larger than five times a curvature radius of a refractive surface of each of the lens units and equal to or smaller than twenty times the curvature radius of the refractive surface of each of the lens units.

16. The optical module according to claim 15, wherein the curvature radius of the refractive surface of the lens serving as the correction optical element is equal to or larger than eight times the curvature radius of the refractive surface of each of the lens units and equal to or smaller than twelve times the curvature radius of the refractive surface of each of the lens units.

17. The optical module according to claim 1, wherein the correction optical element includes at least one prism.

18. An optical device comprising:
the optical module according to claim 1.

* * * * *